US006168647B1

(12) United States Patent
Perry, Jr. et al.

(10) Patent No.: US 6,168,647 B1
(45) Date of Patent: *Jan. 2, 2001

(54) MULTI-STAGE VESSEL AND SEPARATOR/ COALESCER FILTER ELEMENT

(75) Inventors: Marney Dunman Perry, Jr., Mineral Wells; Stephen A. von Phul, Weatherford; John A. Krogue; David J. Burns, both of Mineral Wells, all of TX (US)

(73) Assignee: Perry Equipment Corporation, Mineral Wells, TX (US)

( * ) Notice: Under 35 U.S.C. 154(b), the term of this patent shall be extended for 0 days.

This patent is subject to a terminal disclaimer.

(21) Appl. No.: 09/237,446

(22) Filed: Jan. 26, 1999

(51) Int. Cl.[7] ............................. B01D 46/24; B01D 46/44
(52) U.S. Cl. .................................. 95/19; 95/24; 95/268; 95/286; 96/409; 96/414; 96/421; 55/319; 55/324; 55/423; 55/502
(58) Field of Search .................................. 95/19, 24, 268, 95/286; 96/409, 414, 421; 55/319, 318, 321, 324, 423, 484, 502

(56) References Cited

U.S. PATENT DOCUMENTS

| | | | |
|---|---|---|---|
| 3,291,385 | * 12/1966 | Williams et al. | 55/321 |
| 3,888,644 | * 6/1975 | Holland et al. | 55/324 |
| 4,256,474 | * 3/1981 | Berger, Jr. et al. | 55/318 |
| 4,284,422 | * 8/1981 | Ferland | 55/321 |
| 4,297,116 | * 10/1981 | Cusick | 55/319 |
| 4,433,987 | * 2/1984 | Lenox | 55/324 |
| 4,444,575 | * 4/1984 | Miller et al. | 55/318 |
| 5,846,271 | * 12/1998 | Flynn et al. | 55/318 |
| 5,919,284 | * 7/1999 | Perry, Jr. et al. | 55/324 |

\* cited by examiner

*Primary Examiner*—David A. Simmons
*Assistant Examiner*—Minh-Chau T. Pham
(74) *Attorney, Agent, or Firm*—Charles D. Gunter, Jr.

(57) ABSTRACT

The present invention relates to an apparatus for separating liquids and solids from a gas stream and simultaneously coalescing liquids from the gas stream. The apparatus includes a closed vessel having a longitudinally extending length, an initially open interior, an input port at an extent and an output port at an opposite extent thereof. There is a partition located within the vessel interior that divides the vessel interior into a first stage and a second stage. There is at least one opening in the partition. A separator/coalescer filter element is disposed within the vessel to sealingly extend from within the first stage through the opening into the second stage. There is a chevron-type seal or an O-ring seal between the filter element and the opening. The input port, vessel interior, separator/coalescer filter element and output port together define a flow passage within the apparatus, whereby the gas stream flows into the first stage through the input port and through the filter element hollow core, thereby filtering solids out of the gas stream, separating liquids from the gas stream, and pre-coalescing liquids in the gas stream. The gas stream then flows along the hollow core past the partition and back through the filter element into the second stage through a louvered impingement baffle, thereby coalescing liquids out of the gas stream, the gas stream then exiting the second stage through the outlet port. The louvered impingement baffle conditions the gas stream to create a scrubbing effect on any fine mist exiting the separator/coalescer filter element.

66 Claims, 5 Drawing Sheets

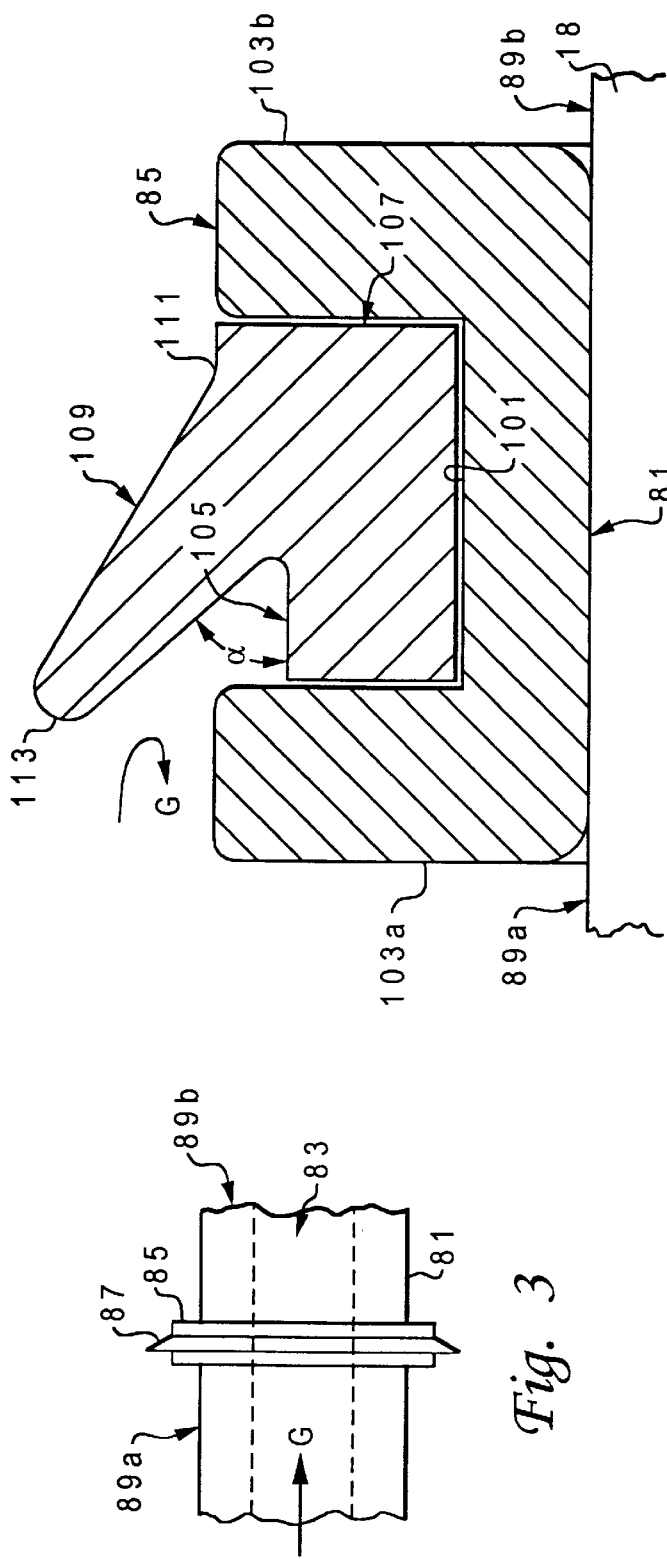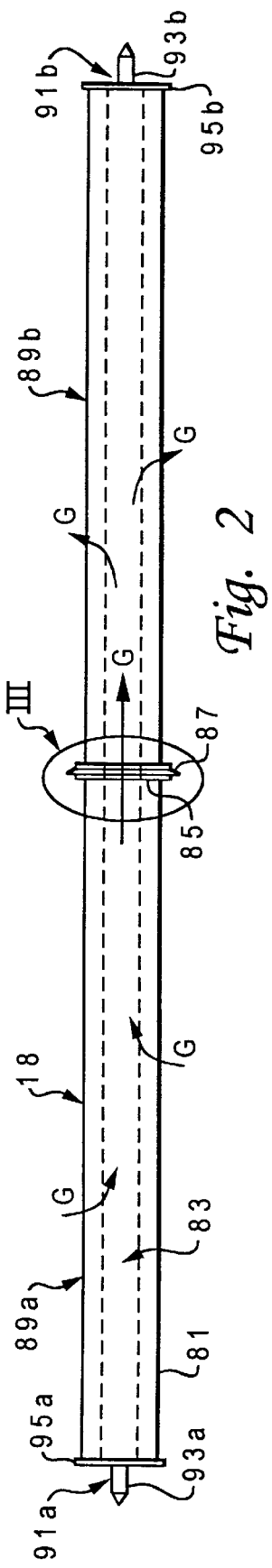

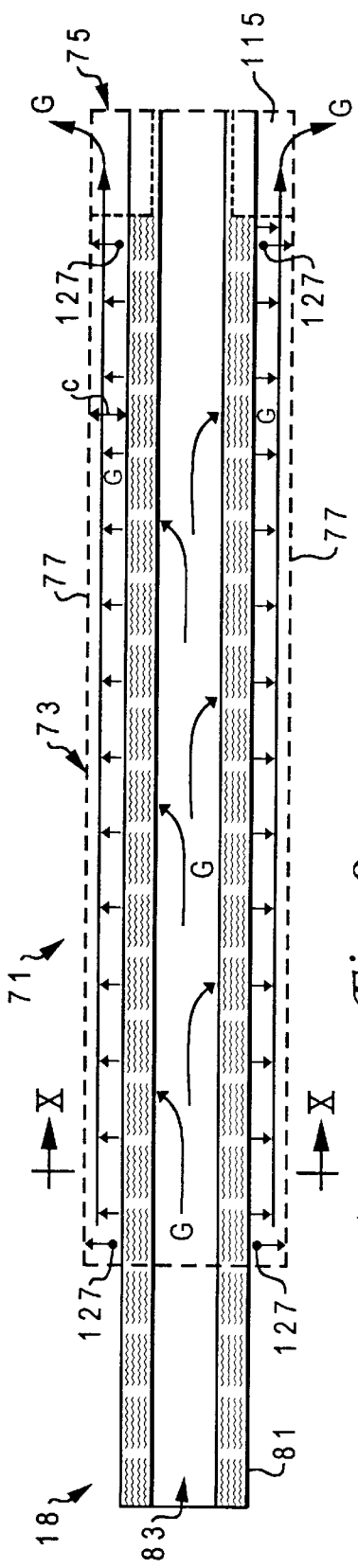
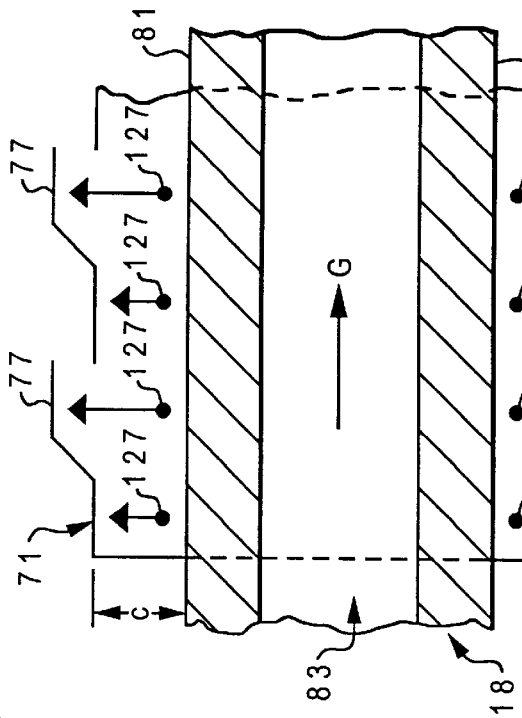
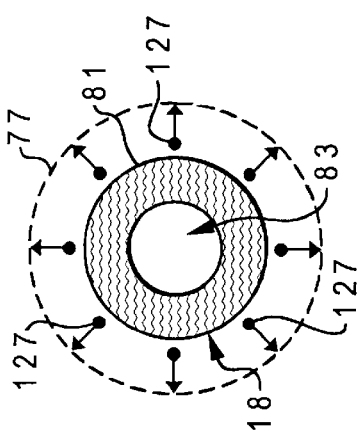
Fig. 9
Fig. 8
Fig. 10

MULTI-STAGE VESSEL AND SEPARATOR/COALESCER FILTER ELEMENT

BACKGROUND ART

1. Field of the Invention

The invention relates generally to separator/coalescer vessels useful in processing immiscible fluids and to filter elements for such vessels, and, more specifically, to a multi-stage gas separator/coalescer and filter elements therefore.

2. Description of Related Art

Gas filter elements for separating solids and liquids from contaminated gas streams are well known, as are gas filter elements for coalescing entrained liquids from a gas stream. Often these types gas filters are installed in multi-stage vessels, which are in turn installed in a gas pipeline, to perform these filtering functions. For example, U.S. Pat. No. 3,888,644 issued to Holland et al. discloses an apparatus with multiple compartments. In Holland, one compartment contains filter elements for separating solids and another compartment contains different filter elements for coalescing liquids entrained in the gas stream. The same is true for U.S. Pat. No. 4,297,116 issued to Cusick. Although these and other devices are capable of filtering solids and coalescing entrained liquids from a gas stream, they require completely different types of filter elements to perform the separating and coalescing functions. This adds to the costs of the devices and makes them difficult to maintain.

International Application No. PCT/US98/01963, published under International Publication No. WO 98/33578, invented by the same inventors as the subject application, discloses a multi-stage vessel using individual separator/coalescer filter elements to separate solids, filter liquids, and coalesce liquids. In addition, the separator/coalescer filter elements envisioned for use in the present invention are of the same general type as those disclosed in U.S. Pat. No. 5,827,430, issued Oct. 27, 1998 to Perry, Jr., et al. Despite these advances in the art, there continues to be a need for improved vessel construction and filter element design in order to increase filtration efficiency and provide improved reliability, while decreasing the cost of vessel maintenance.

BRIEF SUMMARY OF THE INVENTION

There is a need for an apparatus comprising a multi-stage vessel that utilizes individual tubular separator/coalescer filter elements of generally homogenous construction that function in all of the stages of the vessel to filter solids, separate liquids, pre-coalesce liquids, and coalesce liquids. Preferably. each filter element is a one-piece filter element that has a seal held in a seal holder, the seal holder being permanently affixed to the filter element. Such a filter element could be quickly and easily removed or replaced from the multi-stage vessel.

It is an object of the invention to provide a multi-stage vessel having replaceable tubular separator/coalescer filter elements that are installed through openings in a partition in the vessel. A chevron-type seal or an O-ring is removably disposed in a seal holder that is permanently attached to the filter element. This arrangement ensures that a gas stream that flows into a first stage of the multi-stage vessel through an inlet will then flow through the tubular separator/coalescer filter elements from the outside towards the inside. The first stage of the multi-stage vessel separates solids, separates large liquid droplets, and pre-coalesces liquid mist or aerosols. Further, this arrangement ensures that the gas stream will then flow through the separator/coalescer filter elements from the inside towards the outside into a second stage of the multi-stage vessel, and out of the multi-stage vessel through an outlet. The second stage of the multi-stage vessel provides final coalescing and removal of fine liquid mist and aerosols. In a horizontal embodiment of the invention, both the first stage and the second stage of the multi-stage vessel are in fluid communication with collection sumps.

It is another object of the invention to provide a multi-stage vessel in which each separator/coalescer filter element is surrounded by a removable, louvered impingement baffle in the second stage of the multi-stage vessel. The louvered impingement baffle is an impingement device that acts as a barrier to remove liquid particles from the gas stream. Because small liquid droplets that are expelled pick up micro-fine liquid droplets, the louvered impingement baffle also facilitates liquid scrubbing of the gas stream.

It is another object of the invention to provide a multi-stage vessel in which each louvered impingement baffle includes an end cap that has a plurality of exhaust ports through which the majority of the gas stream flows after the gas stream exits the separator/coalescer filter elements.

It is another object of the invention to provide a multi-stage vessel with a second-stage screen to prevent separated liquids from becoming re-entrained into the gas stream.

It is another object of the invention to provide a mist-collecting, multi-stage vessel utilizing individual separator/coalescer filter elements for separating and filtering immiscible fluids.

It is another object of the invention to provide a multi-stage vessel in which the separator/coalescer filter elements are sealed on each end by end caps that have integral guide posts. The guide posts allow support members to support and spatially position the filter elements within the multi-stage vessel without the need for additional fastening devices.

It is another object of the invention to provide a multi-stage vessel utilizing separator/coalescer filter elements in which the filter elements can be installed and replaced without the need for tools through a single opening in the vessel.

A principle advantage of the present invention is that a single type of separator/coalescer filter element is used to perform the functions of filtering solids, separating liquids, pre-coalescing liquid mist and aerosols, and coalescing liquids out of the gas stream. The filter elements can be quickly and easily changed through a single opening in the multi-stage vessel, significantly reducing maintenance costs.

The above as well as additional objects, features, and advantages of the invention will become apparent in the following detailed description.

BRIEF DESCRIPTION OF THE DRAWINGS

FIG. 2 is a side view of the separator/coalescer filter element of FIG. 1.

FIG. 3 is an enlarged view of the chevron-type seal and seal holder of the separator/coalescer filter element of FIG. 2 taken at III.

FIG. 4 is a partial cross-sectional view of the chevron-type seal and the seal holder of FIGS. 2 and 3.

FIG. 8 is a schematic view of a portion of the annular louvers of the basket body portion of the flow diffuser basket of the multi-stage vessel of FIG. 1.

FIG. 9 is a schematic illustrating the flow of the gas stream in the second stage of the multi-stage vessel of FIG. 1.

FIG. 10 is a cross-sectional view taken at X—X of FIG. 9.

DETAILED DESCRIPTION OF THE PREFERRED EMBODIMENT

Figure 1:
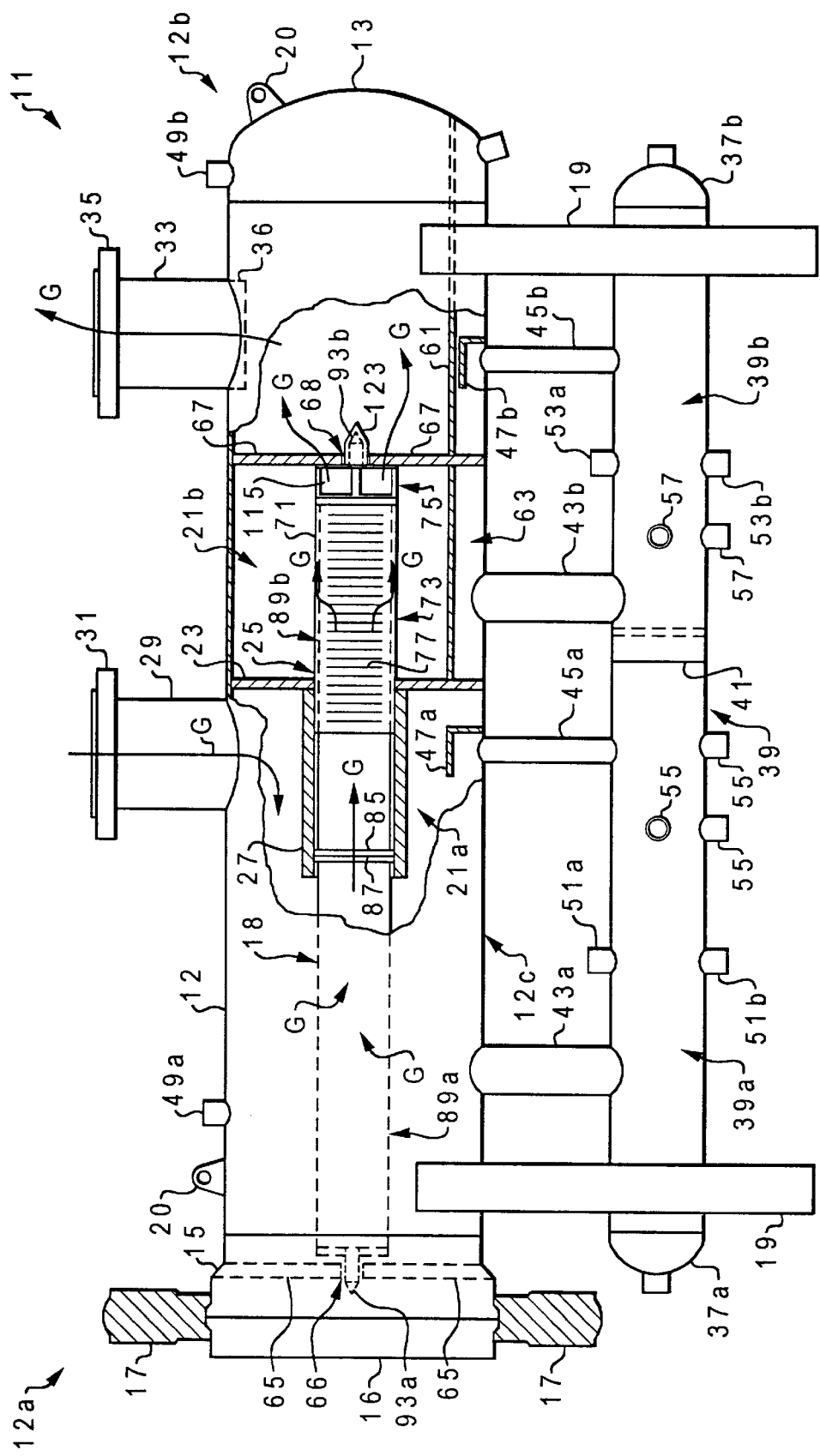
FIG. 1 is a side elevational view in partial section of a preferred embodiment of the multi-stage vessel and separator/coalescer filter element of the present invention.

Referring to FIG. 1 of the drawings, the numeral 11 designates the preferred embodiment of a multi-stage vessel for simultaneously filtering solids, separating liquids, pre-coalescing liquids, and coalescing liquids out of a gas stream according to the present invention. The flow of the gas stream is indicated throughout as arrow G. Multi-stage vessel 11 has a generally tubular hull 12 having an initially open interior. Hull 12 is enclosed on an inlet end 12a by a conventional closure member 15, preferably a releasable, quick-opening closure. Hull 12 is permanently enclosed on an outlet end 12b by a cap 13, preferably elliptical. Closure member 15 consists of a conventional head member 16 and a conventional clamping member 17. Head member 16 is releasably sealed to multi-stage vessel 11 by clamping member 17. Clamping member 17 may be released and head member 16 may be opened to allow access to the interior of hull 12. Clamping member 17 provides a fluid-tight seal between hull 12 and head member 16, preferably with a conventional O-ring (not shown). A plurality of separator/coalescer filter elements 18 are disposed within hull 12. Separator/coalescer filter elements 18 will be explained in more detail below, particularly with respect to FIGS. 2–4. Hull 12 is supported by saddle supports 19. A plurality of eyelets 20 are permanently attached to hull 12 to aid in hoisting multi-stage vessel 11 during manufacture, transportation, installation, and maintenance.

The interior of hull 12 is divided into a first stage 21a and a second stage 21b by a generally transverse partition 23. Partition 23 includes a plurality of openings 25. Although only a single separator/coalescer filter element 18 and filter guide 27 are shown, it should be understood that openings 25 can be arranged, e.g., in rows on partition 23. In a typical installation, four rows having two to four openings are present. A tubular filter guide 27 is aligned with each opening 25. Each filter guide 27 extends longitudinally a selected distance from partition 23 into first stage 21a. An inlet port 29 is disposed on hull 12 and opens into first stage 21a. Inlet port 29 terminates with an inlet flange 31. Inlet flange 31 is adapted to allow multi-stage vessel 11 to be connected to a conventional gas pipeline. Inlet port 29 is located near partition 23 so that as a gas stream flows through inlet port 29 into first stage 21a, the gas stream impinges upon filter guides 27. In this manner, filter guides 27 aid in the removal of solids and free liquids from the gas stream while protecting separator/coalescer filter elements 18 from erosion. This, as well as other functions of filter guides 27, will be explained in more detail below. An outlet port 33 is disposed on hull 12 and opens into second stage 21b. Outlet port 33 terminates with an outlet flange 35. Outlet flange 35 is adapted to allow multi-stage vessel 11 to be connected to a conventional gas pipeline. An annular collar 36 is aligned with outlet port 33 and extends into second stage 21b, thereby creating a barrier and preventing liquids from creeping along the interior surface of second stage 21b and escaping through outlet port 33. Multi-stage vessel 11 is preferably manufactured of steel materials which conform to published pressure-vessel standards, such as ASME Boiler and Pressure Vessel Code, Section 8, Division 1.

Disposed at an underneath portion 12c of hull 12 is a sump 39 for collecting the filtered solids, the separated liquids, the pre-coalesced liquids, and the coalesced liquids that are removed from the gas stream. Sump 39 is divided into a first-stage sump 39a and a second-stage sump 39b by an impermeable sump partition 41. First-stage sump 39a is generally tubular and is sealed on one end by a first-stage cap 37a. Typically, first-stage sump 39a collects separated liquids, pre-coalesced liquids, and solids not filtered by separator/coalescer filter element. Second-stage sump 39b is generally tubular and is sealed on one end by a second-stage cap 37b. Typically, second-stage sump 39b collects coalesced liquids.

A first-stage downcomer 43a provides fluid communication between first stage 21a and first-stage sump 39a. First-stage downcomer 43a allows drainage of the separated solids, the filtered liquids, and the pre-coalesced liquids from first stage 21a into first-stage sump 39a. A second-stage downcomer 43b provides fluid communication between second stage 21b and second-stage sump 39b. Second-stage downcomer 43b allows drainage of the coalesced liquids from second stage 21b into second-stage sump 39b. A first-stage sump vent 45a provides fluid communication between first stage 21a and first-stage sump 39a, and acts as a gas vent. First-stage sump vent 45a allows gas displaced from first-stage sump 39a to flow back into first stage 21a. A second-stage sump vent 45b provides fluid communication between second stage 21b and second-stage sump 39b, and acts as a gas vent. Second-stage sump vent 45b allows gas displaced from second-stage sump 39b to flow back into second-stage 21b. A first-stage vent baffle 47a prevents solids carried by the separated liquids and pre-coalesced liquids from flowing into first-stage sump 39a. A second-stage vent baffle 47b prevents mist from flowing back into second stage 21b from second-stage sump 39b.

Disposed on the upper side of hull 12 and in fluid communication with first stage 21a is a first-stage pressure-gauge port 49a. First-stage pressure-gauge port 49a is adapted to receive a conventional pressure gauge (not shown) for monitoring the pressure in first-stage 21a or the differential pressure. Likewise, located on the upper side of hull 12 and in fluid communication with second-stage 21b is a second-stage pressure gauge port 49b. Second-stage pressure-gauge port 49b is adapted to receive a conventional pressure gauge (not shown) for monitoring the pressure in second stage 21b or the differential pressure.

Continuing with reference to FIG. 1 in the drawings, first-stage gauge glass connections 51a and 51b are disposed opposite each other on the upper and lower sides of first-stage sump 39a and in fluid communication with first-stage sump 39a. First-stage gauge glass connections 51a and 51b are adapted to receive a conventional gauge glass (not shown) for monitoring the level of liquids and solids in first-stage sump 39a. Similarly, second-stage gauge glass connections 53a and 53b are disposed opposite each other on the upper and lower sides of second-stage sump 39b and in fluid communication with second-stage sump 39b. Second-stage gauge glass connections 53a and 53b are adapted to receive a conventional gauge glass (not shown) for monitoring the level of liquids in second-stage sump 39b. A plurality of first-stage sump connections 55, preferably operated by valves (not shown), for draining or siphoning solids, liquids, and pre-coalesced liquids out of first-stage sump 39a, are disposed on first-stage sump 39a. Similarly, a plurality of second-stage sump connections 57, preferably operated by valves (not shown), for draining or siphoning coalesced liquids and fine liquids out of second-stage sump 39b, are disposed on second-stage sump 39b. In addition, first-stage sump connections 55 and second-stage sump connections 57 allow level control instruments and other measuring devices to be inserted into first-stage sump 39a or second-stage sump 39b, respectively.

A screen member 61, preferably made of a woven steel material, is disposed in a lower portion 63 of second stage 21b. Screen member 61 extends substantially the entire length of second stage 21b and acts as a barrier to prevent coalesced liquids that have collected in lower portion 63 from becoming re-entrained in the gas stream.

A plurality of first-stage support straps 65 are disposed in first stage 21a to support separator/coalescer filter elements 18. First-stage support straps 65 generally extend transversely across first stage 21a, and are connected to the interior of hull 12 by a snap fit or any suitable holding clip member (not shown) that does not require tools to release first-stage support straps 65. It should be understood that one or more first-stage support straps 65 may be connected together, or integrally connected, to form a single webbed network of first-stage support straps 65. First-stage support straps 65 are spatially disposed within first stage 21a, such that the gas stream may flow unabated around first-stage support straps 65. First-stage support straps 65 include a plurality of apertures 66 to receive separator/coalescer filter elements 18. First-stage support straps 65 are preferably made of rigid material, such as steel or metal. In addition, first-stage support straps 65 hold separator/coalescer filter elements 18 firmly in place, without longitudinal compression, thereby preventing longitudinal movement of separator/coalescer filter elements 18 in backflow situations. Likewise, a plurality of second-stage support straps 67 are disposed in second stage 21b to support separator/coalescer filter elements 18. Second-stage support straps 67 generally extend transversely across second stage 21b and are connected to the interior of hull 12. As with first-stage support straps 65, one or more second-stage support straps 67 may be connected together, or integrally connected, to form a single webbed network of second-stage support straps 67. Second-stage support straps 67 are spatially disposed within second stage 21b such that the gas stream may flow unabated around second-stage support straps 67 toward outlet port 33. Second-stage support straps 67 include a plurality of apertures 68 to receive separator/coalescer filter elements 18 and associated louvered impingement baffles 71.

A plurality of generally basket-shaped impingement baffles 71 are disposed in second stage 21b to prevent coalesced liquids and fine liquids from becoming re-entrained in the gas stream as the gas stream flows through second stage 21b toward outlet port 33. A separate louvered impingement baffle 71 is associated with each separator/coalescer filter element 18 and each corresponding opening 25 in partition 23. Louvered impingement baffles 71 are adapted to be inserted through tubular filter guides 27 from first stage 21a and into second stage 21b, where louvered impingement baffles 71 are received and carried by second-stage support straps 67. Thus, once installed, louvered impingement baffles 71 extend from second-stage support straps 67, through openings 25, past partition 23, and partially into filter guides 27. Louvered impingement baffles 71 may be removed through filter guides 27 for cleaning, maintenance, and replacement.

Each louvered impingement baffle 71 includes a basket body portion 73 coupled to a basket cap portion 75. It should be understood that basket body portion 73 and basket cap portion 75 may be integrally connected. Basket body portion 73 is adapted to allow the gas stream to flow through, but to prevent coalesced liquids and fine liquids from escaping and becoming re-entrained into the gas stream. Preferably, this is accomplished by a plurality of annular louvers 77 disposed along the extent of basket body portion 73. Louvered impingement baffle 71 will be discussed in more detail below, particularly with respect to FIGS. 5–10.

Referring now to FIG. 2 in the drawings, a typical separator/coalescer filter element 18 of the present invention is illustrated. Separator/coalescer filter element 18 is preferably a tubular filter element having a filter wall 81 and a hollow core 83. Filter wall 81 of separator/coalescer filter element 18 preferably consists of multi-overlapped layers of non-woven fabric strips. The selected density and porosity of separator/coalescer filter elements 18 prevent solids and pre-coalesced liquids from passing through separator/coalescer filter elements 18 and into second stage 21b of multi-stage vessel 11. Thus, separator/coalescer filter elements 18 are of the same general type as those disclosed in U.S. Pat. No. 5,827,430, issued Oct. 27, 1998 to Perry, Jr., et al. However, each separator/coalescer filter element 18 of the present invention is circumscribed by an annular seal holder 85. Seal holder 85 is preferably made of polyester and is permanently sealed, or affixed, to filter wall 81. Seal holder 85 is sealingly bonded to filter wall 81 by a heat treatment, but it should be understood that seal holder 85 may be sealed to filter wall by other conventional means, such as glue or adhesive. It is preferable that seal holder 85 does not compress the layers of separator/coalescer filter element 18. Seal holder releasably carries an annular seal 87, preferably a chevron-type seal, as will be explained in more detail below.

Seal holder 85 and seal 87 separate separator/coalescer filter element 18 into two portions: an inlet portion 89a and an outlet portion 89b. It is not necessary that inlet portion 89a and outlet portion 89b are of the same length. Indeed, depending upon the application, it may be necessary to offset seal holder 85 and seal 87 from the axial center of separator/coalescer filter element 18. It is important to note that both inlet portion 89b and outlet portion 89b are of generally homogenous construction and thus integral and continuous; therefore, inlet portion 89a and outlet portion 89b are functionally identical, although the lengths of inlet portion 89a and 89b may vary. When seal 87 is a chevron-type seal, inlet portion 89a and outlet portion 89b are determined by the orientation of seal 87, as will be explained in more detail below. On the other hand, if seal 87 is an O-ring, or some other type of seal whose functionality is independent of flow direction, then inlet portion 89a and outlet portion 89b may be interchangeable. It should be understood that due to differences in the sealing characteristics between a chevron-type seal and an O-ring type seal, the two seals may not be interchangeable for a given separator/coalescer element 18.

Inlet portion 89a terminates with a filter inlet cap 91a, and outlet portion 89b terminates with a filter outlet cap 91b. It is preferable that both filter inlet cap 91a and filter outlet cap 91b are identical, but for reasons explained below, filter inlet cap 91a and filter outlet cap 91b may be of varying configurations. Filter inlet cap 91a and filter outlet cap 91b form a fluid-tight seal with separator/coalescer filter element 18, such that all fluids in the gas stream must pass through filter wall 81. Filter inlet cap 91a has a filter inlet cap post 93a that protrudes longitudinally outward from separator/coalescer filter element 18. Filter inlet cap post 93a preferably tapers inwardly at its outermost extent. In a similar fashion, filter outlet cap 91b has a filter outlet cap post 93b that protrudes longitudinally outward from separator/coalescer filter element 18. Filter outlet cap post 93b preferably tapers inwardly at its outermost extent. Filter inlet cap 91a and filter outlet cap 91b are illustrated having an filter inlet cap flange 95a and a filter outlet cap flange 95b, respectively, although filter inlet cap 91a and filter outlet cap 91b may also be flush with filter wall 81.

Referring to FIG. 3 in the drawings, a blow-up view of III of FIG. 2 is illustrated. As mentioned above, inlet portion 89a and outlet portion 89b are functionally identical. When seal 87 is a chevron-type seal, as is preferable, the orientation of seal 87 determines which portion of separator/coalescer filter element 18 represents inlet portion 89a, and which portion of separator/coalescer filter element 18 represents outlet portion 89b. Although the orientation of chevron-type seal 87 determines which portion of separator/coalescer filter element 18 represents inlet portion 89a, it should be understood that other means of ensuring proper installation of separator/coalescer filter element exist. For example, filter inlet cap post 93a and filter inlet cap post 93b may be of different sizes or shapes, or filter inlet cap flange 95a and filter outlet cap flange 95b may be of different sizes or shapes.

Referring now to FIG. 4 in the drawings, seal holder 85 is generally U-shaped, having a seal channel 101 and generally parallel legs 103a and 103b. Seal channel 101 is adapted to receive and carry seal 87. Legs 103a and 103b are preferably of the same length, but may be of varying lengths depending upon the type of seal 87 carried by seal holder 85. Seal 87 is preferably a chevron-type seal made of an elastomer, but may be other types of seals, such as a conventional O-ring made out of other suitable materials. Preferably, seal 87 is releasably sealed and carried in seal channel 101 by a tension fit, but it should be understood that seal 87 may be bonded or otherwise adhered in seal channel 101, or to legs 103a or 103b of seal holder 85.

When seal 87 is a chevron-type seal, seal 87 includes a seal base portion 105, a seal vertex portion 107, and a seal cone portion 109. Seal base portion 105 and seal cone portion 107 are integrally joined together at seal vertex portion 107. Seal cone portion 109 is preferably frusto-conical-shaped, having a small-diameter end 111, and a large-diameter end 113. It is preferable that seal base portion 105 and seal cone portion 109 form an angle α of about 60°. In order for seal 87 to operate properly, it is necessary that seal 87 be installed into seal channel 101 such that large-diameter end 113 extends in a direction opposite of the direction of flow of the gas stream. Because large-diameter end 113 extends downward in FIG. 4, the lower end of separator/coalescer filter element 18 becomes inlet portion 89a, and the upper end of separator/coalescer filter element 18 becomes outlet portion 89b. Large-diameter end 113 is flexible and can be compressed toward seal base portion 105. Thus, when separator/coalescer filter element 18 is installed into multi-stage vessel 11 (see FIG. 1), large-diameter end 113 is compressed against filter guide 27, thereby forming a fluid-tight seal between first stage 21a and second stage 21b. Seal holder 85 and seal 87 allow individual tubular separator/coalescer filter elements 18 to filter solids, separate liquids, and pre-coalesce liquids as the gas stream flows through filter wall 81 of inlet portion 89a from outside to inside in first stage 21a, and simultaneously coalesce fluids and fine liquids as the gas stream flows back through filter wall 81 of outlet portion 89b from inside to outside in second stage 21b.

Figure 5:
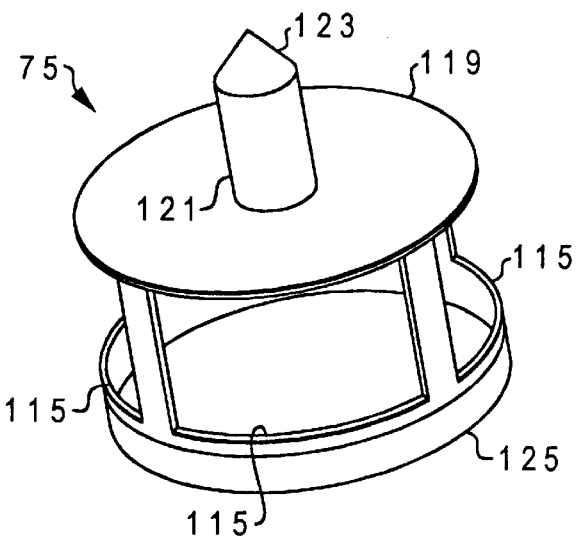
FIG. 5 is a perspective view of the basket cap portion for the flow diffuser basket of the multi-stage vessel of FIG. 1.

Referring now to FIG. 5 in the drawings, basket cap portion 75 of louvered impingement baffle 71 is illustrated in a perspective view. Basket cap portion 75 is generally cup-shaped with a plurality of longitudinal slots 115 spatially arranged around a cylindrical cup wall 117, and which terminate at a flat cup lid 119. A hollow basket cap portion post 121, concentric with cup wall 117 protrudes axially away from cup lid 119. Basket cap portion post terminates at a tapered end 123. Basket cap portion post 123 is configured to matingly receive filter outlet cap post 93b, when separator/coalescer filter element 18 is inserted into louvered impingement baffle 71 (see FIG. 1).

Figure 6:
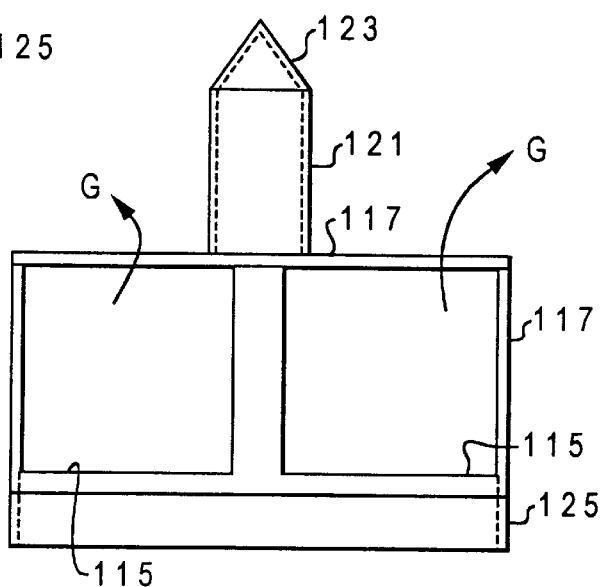
FIG. 6 is a front view of the basket cap portion of FIG. 5.

Referring now to FIG. 6 in the drawings, basket cap portion 75 of louvered impingement baffle 71 is illustrated in a front plan view. An annular recessed portion 125 allows basket cap portion 75 to be flushly coupled to louvered basket body portion 73.

Figure 7:
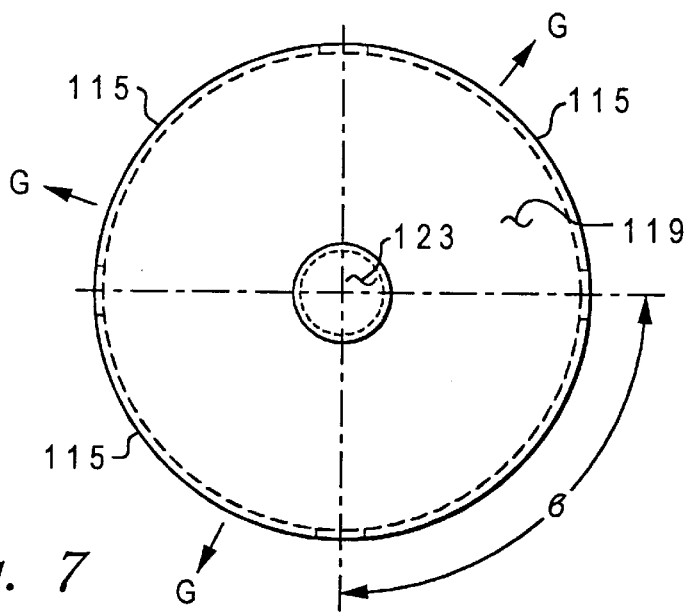
FIG. 7 is a top view of the basket cap portion of FIG. 5.

Referring now to FIG. 7 in the drawings, basket cap portion 75 of louvered impingement baffle 71 is illustrated in a top view. Slots 115 are equidistantly disposed about cap wall 117 by angle 6, preferably 90°.

Referring now to FIG. 8 in the drawings, portions of louvered impingement baffle 71 and separator/coalescer filter element 18 are illustrated. Basket body portion 73 is concentric about separator/coalescer filter element 18 with a clearance c between annular louvers 77 and filter wall 81. Clearance c is preferably about 0.25 inches. As louvered impingement baffle 71 is only located within second stage 21b of multi-stage vessel 11, liquid droplets 127 represent primarily coalesced liquids and fine liquids. In second stage 21b, the gas stream flows through separator/coalescer filter elements 18 from hollow core 83 through filter wall 81. The gas stream flows through annular louvers 77 toward outlet port 33. However, as indicated by the arrows, some liquid droplets 127 have sufficient momentum to be carried radially outward from filter wall 81. Such liquid droplets 127 impinge upon annular louvers 77, and are thus prevented from re-entraining into the gas stream. Louvered impingement baffle 71 provides a mechanism for the liquid droplets 127 of coalesced liquids and fine liquids to collect and, ultimately, drain off into second-stage sump 39b.

Referring now to FIG. 9 and FIG. 10 in the drawings, louvered impingement baffle 71 and separator/coalescer filter element 18 are illustrated. FIG. 10 depicts louvered impingement baffle 71 and separator/coalescer filter element 18 in a cross-sectional view taken at X—X of FIG. 9. As is depicted, the entire gas stream flows along hollow core 83, then through filter wall 81, and into the area of clearance c. Although a small portion of the gas stream may flow through annular louvers 77, the vast majority of the gas stream travels along the area of clearance c and exits louvered impingement baffle 71 through slots 115 in basket cap portion 75. Liquid droplets 127 that are expelled into area of clearance c provide a liquid scrubbing mechanism to collect micro-fine liquid droplets entrained in the gas stream.

In operation, separator/coalescer filter elements 81 are installed in multi-stage vessel 11 by releasing clamping member 17 of closure member 15 and opening head 16. Once head 16 is opened, a user may access the interior of multi-stage vessel 11. First-stage support straps 65 are manually released or unsnapped from the holding clip members. A separator/coalescer filter element 18 is then inserted through each filter guide 27 and louvered impingement baffle 71 until it comes into contact with basket cap portion 75. Separator/coalescer filter elements 18 are thus supported in second stage 21b by second-stage support straps 67. Separator/coalescer filter elements 18 should be installed such that seal holder 85 and seal 87 are within and creating a positive seal with filter guides 27. In this manner, each individual separator/coalescer filter element 18 will be operable in both first stage 21a and second stage 21b. It is important that when seal 87 is a chevron-type seal, that large diameter end 113 points toward first stage 21a, so that seal 87 will properly expand and compress against filter guide 27, thereby forming a fluid-tight seal between first stage 21a and second stage 21b.

Once separator/coalescer filter elements 18 have been installed, first-stage support straps are placed back into multi-stage vessel 11. Apertures 66 of first-stage support straps receive filter inlet cap posts 93a. In this manner, first-stage support straps 65 support separator/coalescer filter elements 18 in first stage 21a. Closure member 15 is then resealed by closing head 16 and fastening clamping member 17. Once separator/coalescer filter elements 18 have been installed and multi-stage vessel has been closed, the gas stream may be supplied to multi-stage vessel 11 through inlet 29.

As the gas stream flows into first stage 21a, solids and free liquids are separated from the gas stream as the gas stream impinges upon filter guides 27. The gas stream flows through filter walls 81 into hollow cores 83. As the gas stream flows through separator/coalescer filter elements 18, liquids are pre-coalesced. Fine separated solids are held within filter walls 81. Separated solids not held within filter walls 81, separated liquids, and pre-coalesced liquids drain toward underneath portion 12c and into first-stage sump 39a through first-stage downcomer 43a. When the collected solids, liquids, and pre-coalesced liquids within first-stage sump 39a reach a selected level, as indicated by a gauge glass (not shown) connected to gauge glass connections 51a and 51b, the solids and pre-coalesced fluids are drained or siphoned out of first-stage sump 39a through first-stage sump connections 55.

Although a portion of the gas stream flows along filter walls 81 from first stage 21a to second stage 21b, the vast majority of the gas stream travels along hollow cores 83 from first stage 21a to second stage 21b. The gas stream then flows from the hollow cores 83 back through the filter walls 81. As the gas stream flows through separator/coalescer filter elements 18 in second stage 21b, fine droplets of liquid coalesce on the fibers of separator/coalescer filter elements 18. Coalesced liquids and fine liquids drip from filter separator/coalescer filter elements 18 and louvered impingement baffle 71, and drain through the second-stage downcomer 43b into second-stage sump 39b. When the collected coalesced fluids and fine liquids in second-stage sump 39b reach a selected level, as indicated by a gauge glass (not shown) connected to gauge glass connections 53a and 53b, the coalesced fluids and fine liquids are drained or siphoned out of second-stage sump 39b through second-stage sump connections 57.

When the pressure drop across multi-stage vessel 11, as indicated by pressure gauges connected at first-stage pressure-gauge port 49a and second-stage pressure-gauge port 49b, reaches a selected value, the separator/coalescer filter elements 18 are removed and either cleaned or discarded. Separator/coalescer filter elements 18 are removed by releasing the clamping member 17, opening head 16 of closure member 15, and removing first-stage support straps 65 as set forth above. Separator/coalescer filter elements 18 are then extracted from multi-stage vessel 11 for cleaning or replacement. New or cleaned separator/coalescer filter elements 18 are then reinserted into multi-stage vessel 11, and first-stage support straps 65 are reconnected to hull 12. Head 16 of closure member 15 is then closed and sealed with clamping member 17, making multi-stage vessel 11 ready to be placed in operation again. It is important to note that separator/coalescer filter elements 18 are held in place and supported only by first-stage support straps 65, second-stage support straps 67, and filter guides 27. No other fasteners are necessary, allowing the user to remove and replace separator/coalescer filter elements 18 without the need for additional tools. The ability to remove and replace separator/coalescer filter elements 18 without any tools whatsoever saves a tremendous amount of time and energy, and gives the present invention tremendous advantages over the prior-art vessels.

The bodies, or tubular filter walls 81, of separator/coalescer filter elements 18 are preferably constructed in the manner and of the materials disclosed in U.S. Pat. No. 5,827,430, issued Oct. 27, 1998 to Perry, Jr., et al. A suitable filter element for use in the present invention is the Peach™ filter commercially available from Perry Equipment Corporation of Mineral Wells, Tex. For example, in a typical application, the separator/coalescer filter elements 18 consist of four multi-overlapped layers of non-woven fabric strips of varying composition. The first layer is composed of equal amounts by volume of fibers purchased from Hoechst Celanese of Charlotte, N.C., United States, sold under the fiber designation "252," "271," and "224," has a basis weight of 0.576 ounces per square foot, is ten inches wide, and is overlapped upon itself five times. The denier of fiber "252" is 3 and its length is 1.500 inches. The denier of fiber "271" is 15 and its length is 3.000 inches. The denier of fiber "224" is 6 and its length is 2.000 inches.

The second layer is composed of equal amounts by volume of "252," "271," and "224," has a basis weight of 0.576 ounces per square foot, is eight inches wide, and is overlapped upon itself four times. The third layer is composed of equal amounts by volume of "252," "271," and "224," has a basis weight of 0.576 ounces per square foot, is eight inches wide, and is overlapped upon itself four times. The fourth layer is composed of equal amounts by volume of "252" and a fiber sold under the name Tairilin™, a commercially available synthetic polymer has a basis weight of 0.576 ounces per square foot, is six inches wide, and is overlapped upon itself three times. Fiber "252" being of the core and shell type serves as the binder fiber in each of the aforementioned blends.

Separator/coalescer filter elements 18 and multi-stage vessel 11, thus manufactured, can coalesce and remove 99.5% of all liquid droplets 0.3 microns and larger and can remove 99.99% of all solid particles 0.3 microns and larger at a combined pressure drop across multi-stage vessel 11 of approximately one to three pounds per square inch.

Another application of the present invention is the conversion of a conventional single-stage vessel (not shown) into a multi-stage vessel of the present invention. To perform this retrofit operation, it is necessary that the existing single-stage vessel have an inlet port, an outlet port, and a closure member. The existing single-stage vessel (not shown) is converted into the multi-stage vessel by inserting certain elements of the present invention (see FIG. 1) into the single-stage vessel through the closure member. The necessary elements include: partition 23 having at least one opening 25, tubular filter guide 27, louvered impingement baffle 71, first-stage support straps 65, second-stage support straps 67, and separator/coalescer filter element 18 having seal holder 85 and seal 87. To perform the retrofit operation, second-stage support straps 67 and partition 23 are inserted through the closure member of the existing single-stage vessel. Partition 23 is sealingly disposed between the inlet port and the outlet port. This converts the single-stage vessel into a multi-stage vessel in which the inlet port opens into a new first stage, similar to first stage 21a, and the outlet port opens into a new second stage, similar to second stage 21b. A tubular filter guide 27 is aligned with each opening 25, and each tubular filter guide 27 extends into the new first stage. A removable louvered impingement baffle 71 is inserted through each tubular filter guide 27 and into second-stage support strap 67. Each louvered impingement baffle 71 extends from partition 23 to second-stage support strap 67 located in the new second stage.

A tubular separator/coalescer filter element 18 having a filter wall 81, a hollow core 83, a seal holder 85 bonded to filter wall 81, and a seal 87 carried by seal holder 85, is inserted through filter guide 27, and into louvered impingement baffle 71, such that a positive seal is created between seal 87 and filter guide 27. First-stage support straps 65 are then installed to support separator/coalescer filter elements 18. Once the closure member is sealingly closed, the once single-stage vessel can be operated as a multi-stage vessel according to the present invention.

Figure 11:
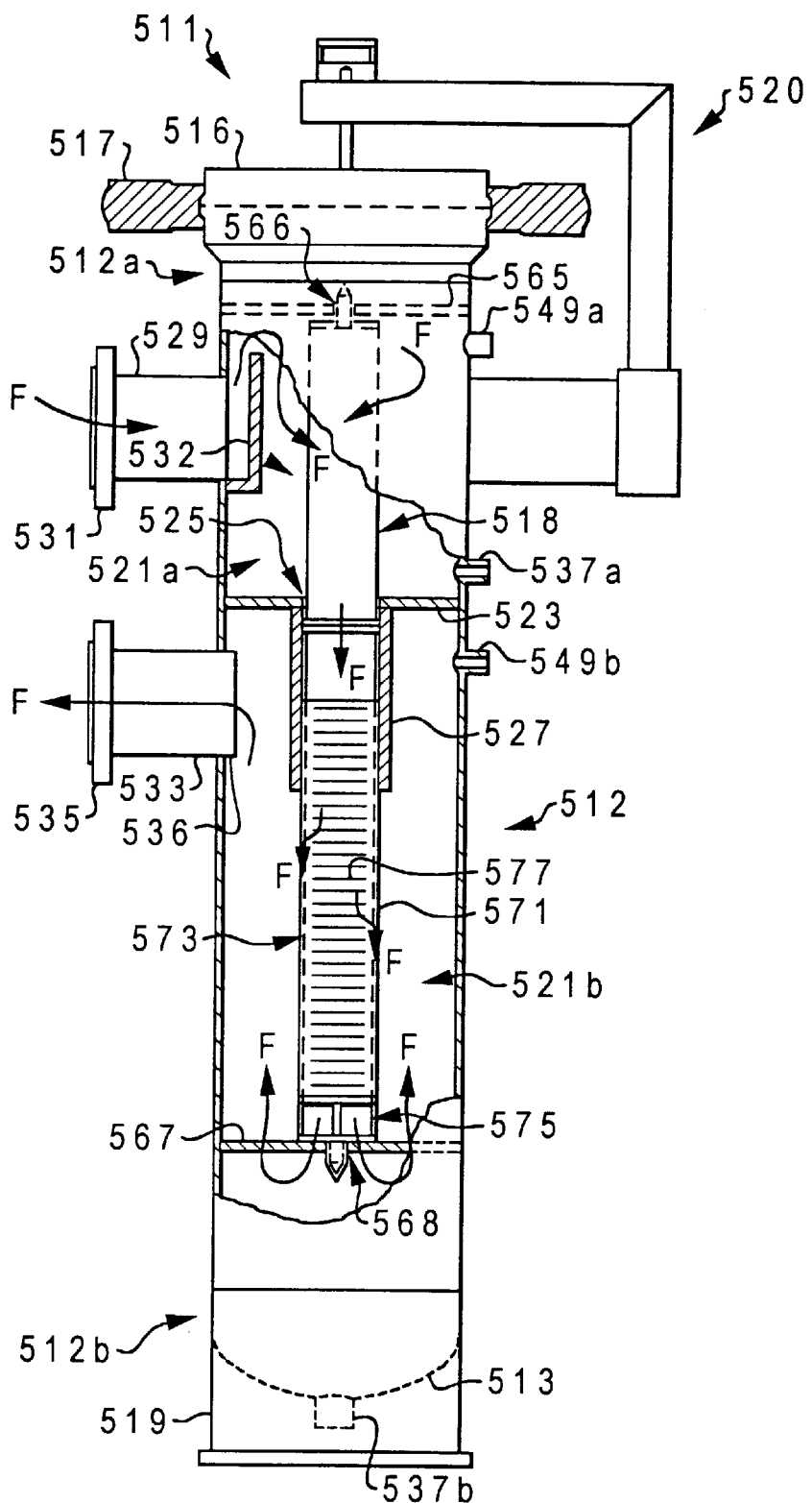
FIG. 11 is a cross-sectional view of a vertical embodiment of the multi-stage vessel and separator/coalescer filter element of the present invention.

Referring now to FIG. 11 in the drawings, another embodiment of the present invention is illustrated. Although multi-stage vessel 11 has been shown in a generally horizontal configuration, it should be understood that multi-stage vessel 11 may also be configured in a generally vertical embodiment having a vertical multi-stage vessel 511. Although multi-stage vessel 511 simultaneously filters solids, separates liquids, pre-coalesces liquids, and coalesces liquids out of a gas stream, multi-stage vessel 511 is better suited for mist collection than for sludge collection. In addition, multi-stage vessel 511 is well suited for applications involving immiscible fluids, and as such, can be used in applications requiring the separation and filtration of two immiscible liquids or immiscible liquids and gases. The flow of the gas stream is indicated below as arrow F. Multi-stage vessel 511 has a generally tubular hull 512 having an initially open interior. Hull 512 is releasably enclosed on an upper inlet end 512a by a conventional closure member 515, preferably a quick-opening closure. Hull 512 is permanently enclosed on a lower outlet end 512b by a cap 513, preferably elliptical. Closure member 515 consists of a conventional head member 516 and a conventional clamping member 517. Head member 516 is releasably sealed to multi-stage vessel 511 by clamping member 517. Clamping member 517 may be released, and head member 516 may be opened to allow access to the interior of hull 512. Clamping member 517 provides a fluid-tight seal between hull 512 and head member 516, preferably with a conventional O-ring (not shown). A plurality of separator/coalescer filter elements 518 are disposed within hull 512. Separator/coalescer filter elements 518 are identical in form and function to separator/coalescer filter elements 18. Hull 512 is supported by support members 519. A conventional davit assembly 520 supports head 516 when head 516 so that head 516 may be swung open to allow access to multi-stage vessel 511.

The interior of hull 512 is divided into a first stage 521a and a second stage 521b by a generally transverse partition 523. Partition 523 includes a plurality of openings 525. A tubular filter guide 527 is aligned with each opening 525. Each filter guide 527 extends longitudinally a selected distance from partition 523 into second stage 521b. Filter guides 527 function identically as filter guides 27, except that filter guides 527 do not serve as impingement surfaces for the gas stream. An inlet port 529 is disposed on hull 512 and opens into first stage 521a. Inlet port 529 terminates with an inlet flange 531. Inlet flange 531 is adapted to allow multi-stage vessel 511 to be connected to a conventional gas pipeline. An inlet baffle 532 is disposed within first stage 521a and is aligned with inlet port 529, such that as the gas stream flows through inlet port 529 into first stage 521a, the gas stream impinges upon inlet baffle 532. In this manner, inlet baffle 532 aids in the removal of solids and free liquids from the gas stream while protecting separator/coalescer filter elements 518 from erosion. An outlet port 533 is disposed on hull 512 and opens into second stage 521b. Outlet port 533 terminates with an outlet flange 535. Outlet flange 535 is adapted to allow multi-stage vessel 511 to be connected to a conventional gas pipeline. An annular collar 536 is aligned with outlet port 533 and extends into second stage 521b, thereby creating a barrier and preventing liquids from creeping along the interior surface of second stage 521b and escaping through outlet port 533. Multi-stage vessel 511 is preferably manufactured of steel materials which conform to published pressure-vessel standards, such as ASME Boiler and Pressure Vessel Code, Section 8, Division 1.

Multi-stage vessel 511 does not include a separate sump; instead, the filtered solids are held within the walls of separator/coalescer filter elements 518, and the separated liquids and the pre-coalesced liquids collected in first stage 521a drain toward partition 523 and settle at the bottom of first stage 521a. The separated liquids and the pre-coalesced liquids may be removed through a resealable first-stage nozzle 537a. The coalesced liquids and fine liquids collected in second stage 521b drain toward outlet end 512b and settle in cap 513. The coalesced liquids and fine liquids may be removed through a resealable second-stage nozzle 537b. Additionally, by opening first-stage nozzle 537a or second-stage nozzle 537b, level control instruments and other measuring devices may be inserted into first stage 521a or second-stage sump 521b, respectively.

Disposed on hull 512 and in fluid communication with first stage 521a is a first-stage pressure-gauge port 549a. First-stage pressure-gauge port 549a is adapted to receive a conventional pressure gauge (not shown) for monitoring the pressure in first-stage 521a or the differential pressure. Likewise, disposed on hull 512 and in fluid communication with second-stage 521b is a second-stage pressure-gauge port 549b. Second-stage pressure-gauge port 549b is adapted to receive a conventional pressure gauge (not shown) for monitoring the pressure in second stage 521b or differential pressure.

A plurality of first-stage support straps 565 are disposed in first stage 521a to support separator/coalescer filter elements 518. First-stage support straps 565 generally extend transversely across first stage 521a, and are connected to the interior of hull 512 in the same releasable manner as how first-stage support straps 65 are connected to hull 12. It should be understood that one or more first-stage support straps 565 may be connected together, or integrally connected, to form a single webbed network of first-stage support straps 565. First-stage support straps 565 are spatially disposed within first stage 521a such that the gas stream may flow unabated around first-stage support straps 565. First-stage support straps 565 include a plurality of apertures 566 to receive separator/coalescer filter elements 518. Likewise, a plurality of second-stage support straps 567 are disposed in second stage 521b to support separator/coalescer filter elements 518. Second-stage support straps 567 generally extend transversely across second stage 521b and are connected to the interior of hull 512. As with first-stage support straps 565, one or more second-stage support straps 567 may be connected together, or integrally connected, to form a single webbed network of second-stage support straps 567. Second-stage support straps 567 are spatially disposed within second stage 521b such that the gas stream may flow unabated around second-stage support straps 567 toward outlet port 533. Second-stage support straps 567 include a plurality of apertures 568 to receive separator/coalescer filter elements 518 and associated louvered impingement baffles 571.

A plurality of louvered impingement baffles 571 are disposed in second stage 521b to prevent coalesced liquids and fine liquids from becoming re-entrained in the gas stream as the gas stream flows through second stage 521b toward outlet port 533. A separate louvered impingement baffle 571 is associated with each separator/coalescer filter element 518 and each corresponding opening 525 in partition 523. Louvered impingement baffles 571 are identical in form and function as louvered impingement baffles 71. However, because filter guides 527 extend into second stage 521b, instead of first stage, as in the horizontal embodiment, once installed, louvered impingement baffles 571 only extend from second-stage support straps 567 partially into filter guides 527. As is the case with the horizontal embodiment, each louvered impingement baffle 571 includes a basket body portion 573 coupled to a basket cap portion 575. Each louvered impingement baffle 571 includes a plurality of annular louvers 577 disposed along the extent of basket body portion 573. Operation of multi-stage vessel 511 of the vertical embodiment is substantially identical to the operation of multi-stage vessel 11 of the preferred horizontal embodiment. One exception is that the gas stream makes a 180° turn in second stage 521b in order to exit outlet port 533. This flow pattern is beneficial in applications in which it is desirable to maintain the level of separated liquids below outlet port 533.

It should be apparent from the foregoing that an invention having significant advantages has been provided. While the invention is shown in only one of its forms, it is not just limited but is susceptible to various changes and modifications without departing from the spirit thereof.

We claim:

1. An apparatus for simultaneously filtering solids from a gas stream, separating liquids from the gas stream, pre-coalescing liquids from the gas stream, and coalescing liquids from the gas stream, the apparatus comprising:
    a closed vessel having a length and an initially open interior;
    a partition disposed within the vessel interior, the partition dividing the vessel interior into a first stage and a second stage;
    at least one opening in the partition;
    an inlet port in fluid communication with the first stage;
    an outlet port in fluid communication with the second stage;
    at least one tubular separator/coalescer filter element having a filter wall and a hollow core, each tubular separator/coalescer filter element being disposed within the vessel to sealingly extend from within the first stage through one of the openings into the second stage;
    an annular seal holder permanently affixed around each tubular separator/coalescer filter element, the annular seal holder being selectively located along the extent of the tubular separator/coalescer filter element; and
    an annular seal disposed between each annular seal holder and each tubular filter guide to prevent the gas stream from flowing from the first stage into the second stage without flowing through the tubular separator/coalescer filter element.

2. The apparatus according to claim 1, further comprising:
    a tubular filter guide coupled to the partition and aligned with each opening, each tubular filter guide extending into the first stage, each tubular filter guide facilitating disposal of one of the tubular separator/coalescer filter elements through one of the openings, each tubular filter guide being disposed in the first stage such that the gas stream from the inlet port impinges thereupon, thereby causing free liquids in the gas stream to fall out.

3. The apparatus according to claim 1, wherein the input port, the vessel interior, the tubular separator/coalescer filter element, and the output port together defining a flow passage within the apparatus, whereby the gas stream flows into the first stage through the input port and through the filter wall, thereby separating solids out of the gas stream, separating liquids from the gas stream, and pre-coalescing liquids in the gas stream, whereby the gas stream then flows along the hollow core past the partition and back through the filter wall into the second stage, thereby coalescing liquids out of the gas stream, and whereby the gas stream then flows out of the second stage through the outlet port.

4. The apparatus according to claim 1, wherein the annular seal is a chevron seal having an annular base portion adapted to be received by the annular seal holder, and a frusto-conical portion having a small-diameter end and an opposing large-diameter end, the small-diameter end being connected to the annular base portion, the large-diameter end extending in the direction of the first stage.

5. The apparatus according to claim 1, wherein the annular seal is an O-ring.

6. The apparatus according to claim 1, further comprising:
    a first end cap sealingly coupled to a first-stage end of the tubular separator/coalescer filter element, the first-stage end being located within the first stage; and
    a second end cap sealingly coupled to a second-stage end of the tubular separator/coalescer filter element, the second-stage end being located within the second stage;
    the first end cap and the second end cap each having an axial guide stem protruding longitudinally outward from the tubular separator/coalescer filter element.

7. The apparatus according to claim 1, further comprising:
    a removable first-stage support strap disposed in the first stage opposite the partition, the first-stage support member being adapted to receive and spatially support the tubular separator/coalescer filter elements without the need for additional fasteners; and
    a second-stage support member disposed in the second stage opposite the partition, the second-stage support member being adapted to receive and spatially support the tubular separator/coalescer filter elements without the need for additional fasteners.

8. The apparatus according to claim 1, further comprising:
    a first-stage sump in fluid communication with the first stage; and
    a second-stage sump in fluid communication with the second stage;
    the first-stage sump and the second-stage sump collecting the filter solids, the separated liquids, the pre-coalesced liquids, and the coalesced liquids.

9. The apparatus according to claim 1, further comprising:

an impingement baffle disposed in the second stage about the tubular separator/coalescer filter element, the louvered impingement baffle facilitating further coalescing of the coalesced liquids.

10. The apparatus according to claim 9, wherein the impingement baffle is removable through the filter guide.

11. The apparatus according to claim 9, wherein the impingement baffle is annularly louvered.

12. The apparatus according to claim 9, wherein the impingement baffle comprises:

a tubular body portion having transverse louvers; and a cap portion coupled to the tubular body portion, the cap portion having a plurality of exhaust ports through which the gas stream flows from the separator/coalescer filter element into the second stage.

13. The apparatus according to claim 1, further comprising:

a screen member disposed in the second stage, the screen member being adapted to prevent the coalesced liquids from being re-entrained into the gas stream.

14. The apparatus according to claim 1, further comprising:

a first-stage gauge in fluid communication with the first-stage sump for monitoring a level of the separated solids, the separated liquids, and the pre-coalesced liquids; and a second-stage gauge in fluid communication with the second-stage sump for monitoring a level of the coalesced liquids.

15. The apparatus according to claim 1, wherein the tubular separator/coalescer filter element consists of multi-overlapped layers of non-woven fabric strips.

16. The apparatus according to claim 4, wherein the chevron seal is made of an elastomer.

17. The apparatus according to claim 1, further comprising:

an annular collar aligned with the outlet port, the annular collar projecting into the second stage, thereby preventing liquids from escaping the second stage.

18. The apparatus according to claim 1, wherein the annular seal holder is made of polyester.

19. A tubular separator/coalescer filter element for simultaneously filtering solids, separating liquids, pre-coalescing liquids, and coalescing liquids from a gas stream in a multi-stage vessel having a first stage and a second stage, the first stage being separated from the second stage by a partition having at least one opening, the separator/coalescer filter element comprising:

a filter wall having a plurality of overlapped layers of non-woven fabric strips;

a hollow core;

a seal holder permanently disposed on the filter wall; and a seal removably carried by the seal holder, the seal forming a fluid-tight seal between the seal holder and the opening, such that the gas stream flows through the filter wall into the hollow core in the first stage and the gas stream flows out of the hollow core and back through the filter wall in the second stage.

20. The separator/coalescer filter element according to claim 19, wherein the seal holder is polyester.

21. The separator/coalescer filter element according to claim 19, wherein the seal is a chevron seal.

22. The separator/coalescer filter element according to claim 21, wherein the chevron seal is made of an elastomer.

23. The separator/coalescer filter element according to claim 19, wherein the seal is an O-ring.

24. An apparatus for simultaneously filtering solids from a gas stream, separating liquids from the gas stream, pre-coalescing liquids from the gas stream, and coalescing liquids from the gas stream, the apparatus comprising:

a closed vessel having a generally vertically extending length and an initially open interior;

a partition disposed within the vessel interior, the partition dividing the vessel interior into a first stage and a second stage;

at least one opening in the partition;

an inlet port in fluid communication with the first stage;

an outlet port in fluid communication with the second stage;

at least one tubular separator/coalescer filter element having a filter wall and a hollow core, each tubular separator/coalescer filter element being disposed within the vessel to sealingly extend from within the first stage through one of the openings into the second stage;

a tubular filter guide coupled to the partition and aligned with each opening, each tubular filter guide extending into the second stage, each tubular filter guide facilitating disposal of one of the tubular separator/coalescer filter elements through one of the openings;

an annular seal holder sealingly disposed around each tubular separator/coalescer filter element, the annular seal holder being selectively located along the extent of the tubular separator/coalescer filter element; and an annular seal disposed between each annular seal holder and each tubular guide member to prevent the gas stream from flowing from the first stage into the second stage without flowing through the tubular separator/coalescer filter element;

the input port, the vessel interior, the tubular separator/coalescer filter element, and the output port together defining a flow passage within the apparatus, whereby the gas stream flows into the first stage through the input port and through the filter wall, thereby separating solids out of the gas stream, separating liquids from the gas stream, and pre-coalescing liquids in the gas stream, whereby the gas stream then flows along the hollow core past the partition and back through the filter wall into the second stage, thereby coalescing liquids out of the gas stream, and whereby the gas stream then flows out of the second stage through the outlet port.

25. The apparatus according to claim 24, wherein the annular seal is a chevron-type seal having an annular base portion adapted to be received by the annular seal guide, and a frusto-conical portion having a small-diameter end and an opposing large-diameter end, the small-diameter end being connected to the annular base portion, the large-diameter end extending in the direction of the first stage.

26. The apparatus according to claim 24, wherein the annular seal is an O-ring.

27. The apparatus according to claim 24, further comprising:

a first end cap sealingly coupled to a first-stage end of the tubular separator/coalescer filter element, the first-stage end being located within the first stage; and a second end cap sealingly coupled to a second-stage end of the tubular separator/coalescer filter element, the second-stage end being located within the second stage;

the first end cap and the second end cap each having an axial guide stem protruding longitudinally outward from the tubular separator/coalescer filter element.

28. The apparatus according to claim 24, further comprising:
  a first-stage support member disposed in the first stage opposite the partition, the first-stage support member being adapted to receive and spatially support the tubular separator/coalescer filter elements without the need for additional fasteners; and
  a second-stage support member disposed in the second stage opposite the partition, the second-stage support member being adapted to receive and spatially support the tubular separator/coalescer filter elements without the need for additional fasteners.

29. The apparatus according to claim 24, further comprising:
  a second-stage sump in fluid communication with the second stage;
  the second-stage sump collecting the separated liquids, the separated solids, the pre-coalesced liquids, and the coalesced liquids.

30. The apparatus according to claim 24, further comprising:
  a tubular flow diffuser disposed in the second stage concentrically about the tubular separator/coalescer filter element, the tubular flow diffuser to facilitate further coalescing of the coalesced liquids.

31. The apparatus according to claim 30, wherein the tubular flow diffuser is removable.

32. The apparatus according to claim 30, wherein the tubular flow diffuser is annularly louvered.

33. The apparatus according to claim 30, wherein the tubular flow diffuser comprises:
  a louvered body portion; and
  a cup portion coupled to the louvered body portion, the cup portion having a plurality of exhaust ports through which the gas stream flows from the separator/coalescer filter element into the second stage.

34. The apparatus according to claim 30, wherein the tubular flow diffuser is configured such that it is a liquid scrubbing device for removing micro-fine droplets of liquid in the gas stream.

35. The apparatus according to claim 24, wherein the tubular separator/coalescer filter element consists of multi-overlapped layers of non-woven fabric strips.

36. The apparatus according to claim 25, wherein the chevron seal is made of an elastomer.

37. The apparatus according to claim 24, wherein the annular seal holder is made of polyester.

38. The apparatus according to claim 24, further comprising:
  an annular collar aligned with the outlet port, the annular collar projecting into the second stage, thereby preventing liquids from escaping the second stage.

39. An apparatus for converting an existing single-stage vessel having an inlet port, and an outlet port, and a closure member into a multi-stage vessel having a first stage and a second stage, the apparatus comprising:
  a partition having at least one opening, the partition being adapted to be inserted through the closure member and sealingly disposed within the existing single-stage vessel between the inlet port and the outlet port, the partition thereby converting the existing single-stage vessel into the multi-stage vessel in which the inlet port opens into the first stage and the outlet port opens into the second stage;
  a tubular filter guide aligned with each opening, each tubular filter guide extending into the first stage;
  a removable louvered impingement baffle configured to be inserted through the tubular filter guide, each louvered impingement baffle extending from the partition into the second stage;
  a tubular separator/coalescer filter element having a filter wall, a hollow core, a seal holder bonded to the filter wall, and a seal carried by the seal holder, the separator/coalescer filter element being configured for insertion through the filter guide and into the louvered impingement baffle, such that a positive seal is created between the seal and the filter guide.

40. The apparatus according to claim 39, wherein the seal is a chevron seal.

41. The apparatus according to claim 40, wherein the chevron seal is made of an elastomer.

42. The apparatus according to claim 39, wherein the seal holder is made of polyester.

43. A method of filtering solids, separating liquids, and pre-coalescing liquids, and simultaneously coalescing liquids from a gas stream, the method comprising the steps of:
  providing a multi-stage vessel having a first stage and a second stage, the first stage being separated from the second stage by a partition having at least one opening;
  installing at least one replaceable separator/coalescer filter element within the multi-stage vessel, the separator/coalescer filter element being sealed within the opening in the partition by means of a permanent seal holder and a replaceable seal, the replaceable seal being adapted to form a seal with the opening;
  filtering solids, separating liquids, and pre-coalescing liquids from the gas stream in the first stage; and
  simultaneously coalescing liquids from the gas stream in the second stage.

44. The method according to claim 43, wherein the seal is a chevron seal.

45. The method according to claim 43, wherein the seal is an O-ring.

46. The method according to claim 43, further comprising the step of:
  installing an impingement baffle around each separator/coalescer filter element in the second stage to prevent coalesced liquids from being re-entrained into the gas stream.

47. A method of maintaining a multi-stage vessel and separator/coalescer filter elements, the multistage vessel having a first stage and a second stage, the first stage being separated from the second stage by a partition having at least one opening through which the separator/coalescer filter elements are sealingly disposed, the method comprising the steps of:
  opening the multi-stage vessel;
  removing a filter support member;
  removing at least one separator/coalescer filter element from the multi-stage vessel;
  replacing the separator/coalescer filter element with a replacement separator/coalescer filter element;
  creating a fluid-tight seal between the replacement separator/coalescer filter element and the opening;
  replacing the filter support member; and
  closing the multi-stage vessel.

48. The method according to claim 47, wherein the step of creating a fluid-tight seal between the replacement separator/coalescer filter element and the opening is achieved by using a chevron seal carried about the replacement separator/coalescer filter element.

49. The method according to claim 48, wherein the chevron seal is made of an elastomer.

50. The method according to claim 47, wherein the step of creating a fluid-tight seal between the replacement separator/coalescer filter element and the opening is achieved by using an O-ring.

51. A method of simultaneously filtering solids, separating liquids, pre-coalescing liquids, and coalescing liquids from a gas stream, the method comprising the steps of:

providing a closed vessel having an initially open interior, a partition located within the closed interior, the partition dividing the vessel into a first stage and a second stage, there being at least one opening in the partition;

providing an inlet port in the first stage and an outlet port in the second stage;

installing at least one replaceable tubular separator/coalescer filter element within the vessel, such that the tubular separator/coalescer filter element sealingly extends from within the first stage through one of the openings into the second stage, each tubular separator/coalescer filter element having a filter wall and a hollow core;

providing an annular seal guide sealingly disposed around each tubular separator/coalescer filter element, the annular seal guide being selectively located along the extent of the tubular separator/coalescer filter element;

providing a tubular guide member coupled to the partition and aligned with each opening, each tubular guide member extending into the first stage, each tubular guide member facilitating disposal of one of the tubular separator/coalescer filter elements through one of the openings, each tubular guide member being disposed in the first stage such that the gas stream from the inlet port impinges thereupon, thereby extracting free liquids from the gas stream;

providing an annular seal disposed between each annular seal guide and each tubular guide member to prevent the gas stream from flowing from the first stage into the second stage without flowing through the tubular separator/coalescer filter element;

directing the gas stream into the first stage through the input port;

impinging the gas stream upon the tubular guide members thereby extracting free liquids from the gas stream;

directing the gas stream through the filter element sidewalls into the hollow core, thereby filtering solids out of the gas stream, separating liquids from the gas stream, and pre-coalescing liquids in the gas stream;

directing the gas stream along the hollow core of the filter element past the partition;

directing the gas stream back through the filter element sidewalls into the vessel second stage, thereby coalescing liquids out of the gas stream; and directing the gas stream out of the vessel second stage through the outlet port.

52. The method according to claim 51, wherein the annular seal disposed between each annular seal guide and each tubular guide member is a chevron seal.

53. The method according to claim 51, wherein the annular seal disposed between each annular seal guide and each tubular guide member is an O-ring seal.

54. The method according to claim 51, further comprising the steps of:

sealingly coupling a first end cap having an axial guide stem protruding longitudinally outward from the tubular separator/coalescer filter element to a first-stage end of the tubular separator/coalescer filter element, the first-stage end being located within the first stage; and sealingly coupling a second end cap having an axial guide stem protruding longitudinally outward from the tubular separator/coalescer filter element to a second-stage end of the tubular separator/coalescer filter element, the second-stage end being located within the second stage.

55. The method according to claim 51, further comprising the steps of:

locating a first-stage support member in the first stage opposite the partition, the first-stage support member being adapted to receive and spatially support the tubular separator/coalescer filter elements without the need for additional fasteners; and locating a second-stage support member in the second stage opposite the partition, the second-stage support member being adapted to receive and spatially support the tubular separator/coalescer filter elements without the need for additional fasteners.

56. The method according to claim 51, further comprising the steps of:

providing a first-stage sump in fluid communication with the first stage;

providing a second-stage sump in fluid communication with the second stage; and collecting the separated liquids, the separated solids, the pre-coalesced liquids, and the coalesced liquids with the first-stage sump and the second-stage sump.

57. The method according to claim 51, further comprising the step of:

installing an impingement baffle in the second stage about each tubular separator/coalescer filter element, such that the impingement baffle facilitates further coalescing of the liquids.

58. The method according to claim 57, wherein the impingement baffle is a removable, tubular flow diffuser.

59. The method according to claim 57, further comprising the step of:

providing a plurality of annular louvers along the extent of the impingement baffle.

60. The method according to claim 51, further comprising the step of:

disposing a screen member in the second stage, the screen member being adapted to prevent the separated liquids, the pre-coalesced liquids, and the coalesced liquids from being re-entrained into the gas stream.

61. The method according to claim 51, further comprising the steps of:

coupling a first-stage gauge in fluid communication with the first-stage sump for monitoring a level of the separated solids, the separated liquids, and the pre-coalesced liquids; and coupling a second-stage gauge in fluid communication with the second-stage sump for monitoring a level of the separated liquids, the pre-coalesced liquids, and the coalesced liquids.

62. The method according to claim 51, wherein the step of providing tubular separator/coalescer filter elements consists of providing tubular separator/coalescer filter elements having multi-overlapped layers of non-woven fabric strips.

63. The method according to claim 51, wherein the annular seal is made of an elastomer.

64. The method according to claim 51, further comprising the step of:

providing an annular collar and aligning the annular collar with the outlet port, the annular collar projecting into the second stage, thereby preventing liquids from escaping the second stage.

65. The method according to claim 51, further comprising the steps of:

providing a pressure gauge in fluid communication with the first stage;

providing a pressure gauge in fluid communication with the second stage;

monitoring a pressure drop across the vessel by comparing the pressure in the first stage with the pressure in the second stage; and replacing the filter element when the pressure drop reaches a selected amount.

66. The method according to claim 51, further comprising the steps of:

providing a sump in fluid communication with the vessel for collecting the filtered solids, the separated liquids, the pre-coalesced liquids, and the coalesced liquids;

providing a gauge for monitoring a level of the filtered solids, the separated liquids, the pre-coalesced liquids, and the coalesced liquids;

providing an outlet port in fluid communication with the sump for removing the filtered solids, the separated liquids, the pre-coalesced liquids, and the coalesced liquids; and removing the filtered solids, the separated liquids, the pre-coalesced liquids, and the coalesced liquids when the level exceeds a selected amount.

* * * * *